RECTIFIER ASSEMBLIES

Filed Sept. 4, 1956 4 Sheets-Sheet 1

INVENTOR
LESLIE JAMES CAMBRIDGE CONNELL
BY Kurschner, Kurschner & Ottinger
ATTORNEYS Jan. 7, 1958 L. J. C. CONNELL 2,819,435

RECTIFIER ASSEMBLIES

Filed Sept. 4, 1956 4 Sheets-Sheet 2

INVENTOR

Leslie James Cambridge Connell

BY Kirschstein, Kirschstein & Ottinger

ATTORNEYS

INVENTOR
Leslie James Cambridge Connell
BY Kirschstein, Kirschstein & Ottinger
ATTORNEYS INVENTOR
Leslie James Cambridge Connell
BY Fisch..., Fisch... & Olm...
ATTORNEYS United States Patent Office 2,819,435

Patented Jan. 7, 1958

2,819,435

RECTIFIER ASSEMBLIES

Leslie James Cambridge Connell, Harrow Weald, England, assignor to The General Electric Company Limited, London, England Application September 4, 1956, Serial No. 607,686

Claims priority, application Great Britain September 14, 1955

6 Claims. (Cl. 317—234)

This invention relates to rectifier assemblies of the kind comprising a plurality of rectifier elements and a plurality of spaced cooling fins upon which the rectifier elements are mounted, and an object of the invention is the provision of a robust and compact assembly of this kind.

According to one aspect of this invention, in a rectifier assembly of the kind referred to, the cooling fins are so arranged that a rectifier element mounted on one cooling fin protrudes through an opening in an adjacent cooling fin, and electrical connections to the electrodes of the rectifier elements are made via the cooling fins and via terminals mounted on the assembly, these terminals being spaced from the cooling fins.

The cooling fins are preferably clamped together by means of a plurality of tiebolts extending through the assembly. The terminals may be clamped onto the assembly by means of one or more of these tiebolts, means being provided to insulate the terminals and/or the cooling fins from the tiebolts and to space the terminals from the cooling fins. Preferably the terminals are rigidly mounted on the assembly by means of at least two of the said tiebolts and by an additional tiebolt which is spaced from the cooling fins and common to all the terminals.

According to another aspect of this invention, a cooling fin for a rectifier assembly of the kind referred to, comprises means whereby a rectifier element may be mounted on the cooling fin, means adjacent to its periphery whereby the cooling fin may be clamped to a plurality of cooling fins, and an opening so arranged that a rectifier element mounted on an adjacent cooling fin may protrude therethrough.

Figures 1, 6, 7:
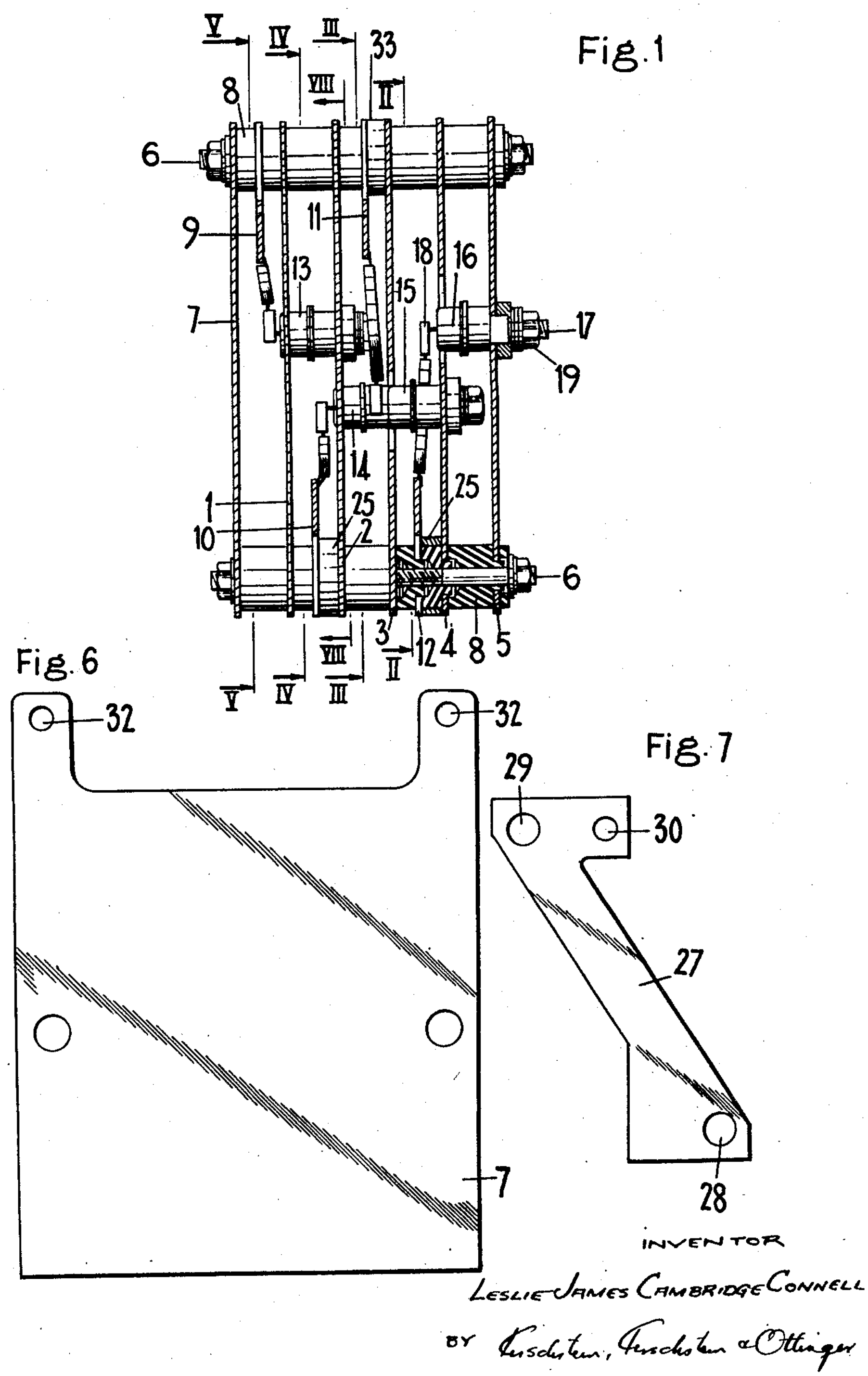
Figure 2:
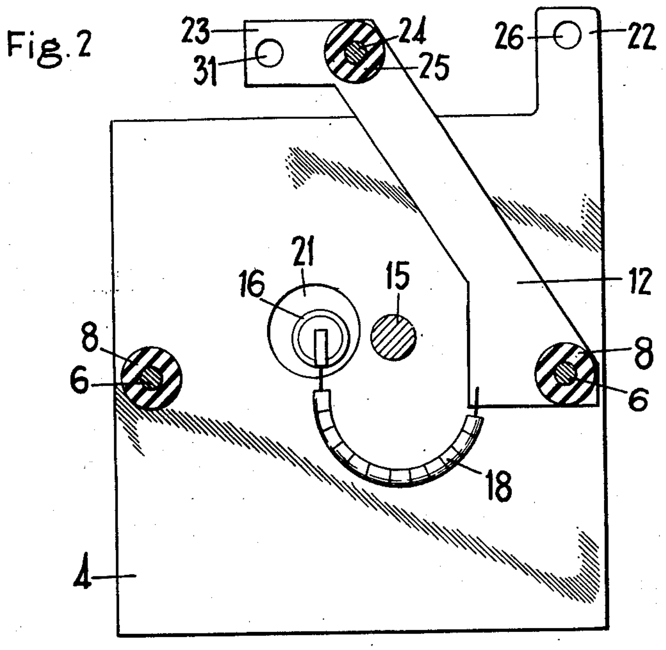
Figure 3:
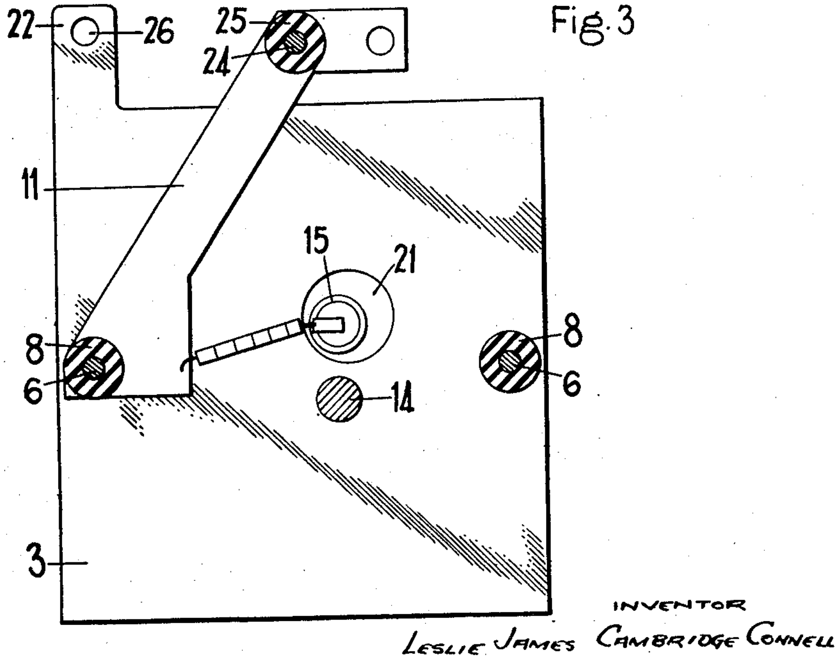
Figure 4:
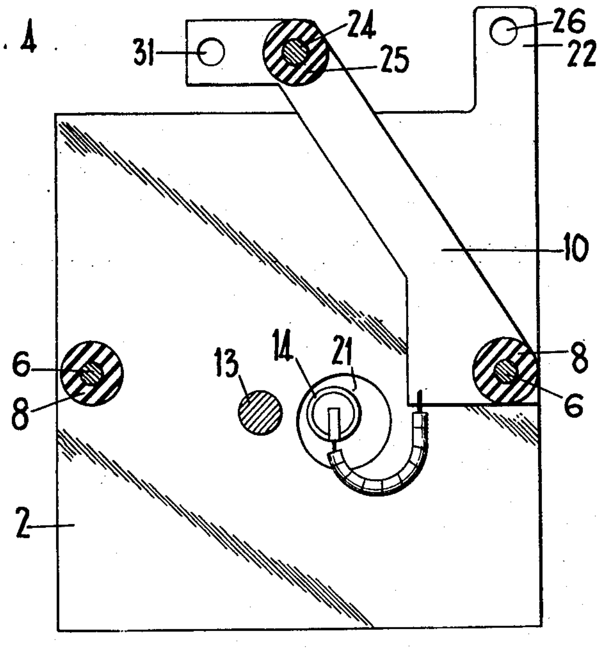
Figure 5:
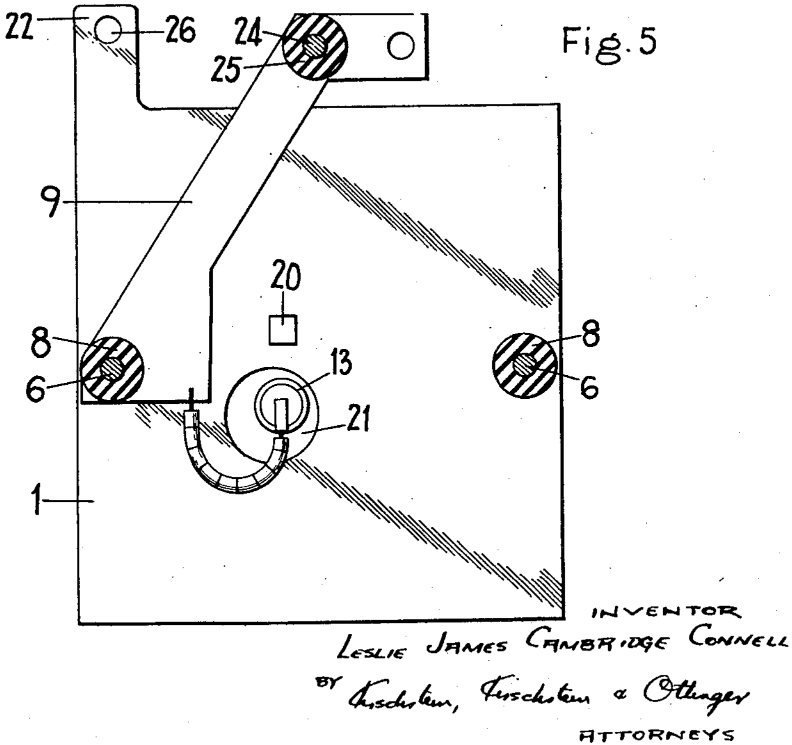
Figure 8:
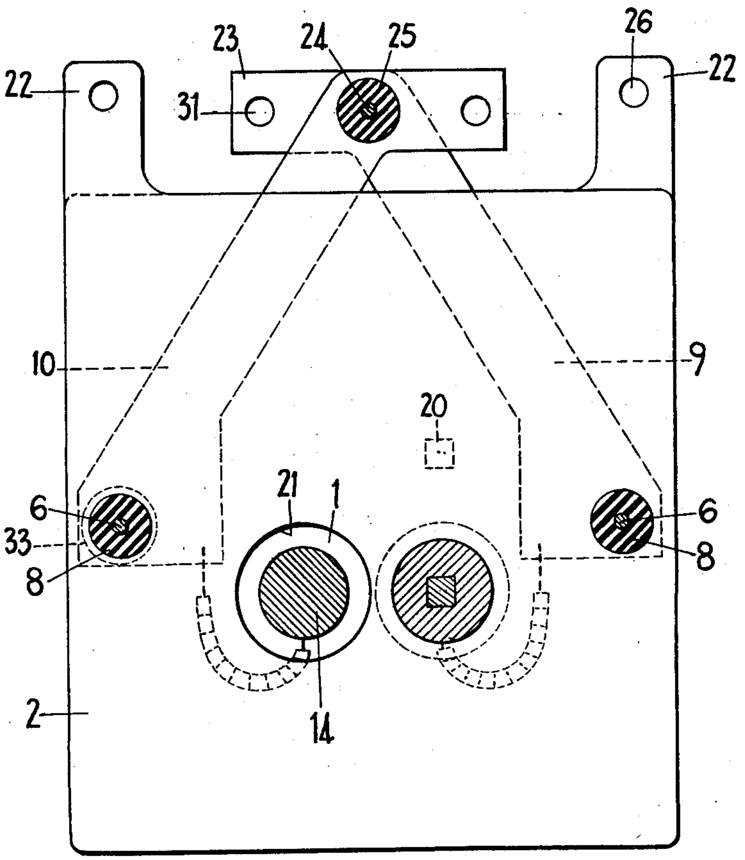

In order that the invention may be fully understood, one semiconductor rectifier assembly in accordance with the present invention will now be described, by way of example, with reference to the accompanying drawings in which:

Figure 1 shows a plan view, partly in section, of the assembly; Figure 2 shows a section on line II—II in Figure 1; Figure 3 shows a section on line III—III in Figure 1; Figure 4 shows a section on line IV—IV in Figure 1; Figure 5 shows a section on line V—V in Figure 1; Figure 6 shows a detail of the assembly; and Figure 7 shows a detail of a modified rectifier assembly, and Figure 8 shows an enlarged section on line VIII—VIII in Figure 1.

Referring to the drawings, a semiconductor rectifier assembly comprises a plurality of substantially square plates 1–5 constituting cooling fins, these plates being spaced apart parallel to each other and clamped together by means of tiebolts 6 passing through holes in the plates, the tiebolts being secured at one end to an end plate 7 no electrical connections being made to this plate. Alternatively the tiebolts may be secured at each end to an end plate or frame member. Insulating bushes of "Tufnol" serve to insulate the plates 1–5 from the tiebolts 6 and to space the plates from one another. A number of anode terminals 9–12 corresponding to the number of rectifier elements in the assembly are clamped to the assembly by the tiebolts 6 and these terminals are spaced from the plates by means of bushes 8 which are also used to insulate the terminals from the tiebolts.

Mounted on the plates 2, 3, 4 and 5 are semiconductor rectifier elements 13, 14, 15 and 16, these rectifier elements being silicon diodes, each having a threaded mounting screw 17 at one end internally connected to the cathode of the diode and an anode lead 18 at the other end, the square shank of the diode and the threaded mounting screw passing through a square mounting hole in the plate and secured by a nut 19. The square mounting hole 20 is clearly seen on the plate 1, Figure 5, there not being a diode mounted on this plate. Spaced from the mounting hole on each plate is a circular opening 21, and the plates are arranged in the assembly so that each diode protrudes through the opening in an adjacent plate. This is achieved by using plates in which the mounting holes and the openings are suitably positioned in the manner which will be described hereinafter.

Cathode connections to the diodes are made via the plates upon which the diodes are mounted, these plates being provided each with a terminal 22 for an external lead. These terminals are formed integrally with the plates. Anode connections to the diodes are made via the anode terminals 9–12, these terminals being situated between, and spaced from, the plates, and clamped to the assembly by one or other of the tiebolts 6. One end of each anode terminal is arranged to project above the tops of the plates, as indicated by 23 in Figure 2, and to this end an external lead may be connected. The anode lead from each diode is soldered to one end of one of the anode terminals, this end being situated close to the anode of the diode in order to keep the anode lead as short as possible.

In order to obtain a rigid assembly, the anode terminals 9–12 are clamped to the assembly by means of three tiebolts. The terminals are mounted on the assembly in two rows, one on each side of the assembly, each terminal being clamped to the plates by one of the tiebolts so that one end projects above the tops of the plates. The terminals mounted on one side of the assembly are clamped to the plates by one of the tiebolts 6, and the terminals mounted on the other side of the assembly are clamped to the plates by the other of the tiebolts 6, while the ends of all the terminals projecting above the plates are aligned and clamped together by a third tiebolt 24 spaced from the plates and passing through holes in these ends. The upper ends of the anode terminals are spaced from each other and insulated from the tiebolt 24 by means of bushes 25.

If desired, some or all of the diodes may be connected in parallel or in series by means of suitable internal connections between appropriate anode terminals and plates. For example, a number of diodes may be connected in series by providing metal sleeves on the appropriate insulating bushes which space the anode terminals from the plates, these sleeves being arranged to make good electrical contact with the terminals and with the plates when the assembly is clamped together. Similarly, a number of diodes may be connected in parallel by means of metal sleeves on the appropriate bushes which space the plates, the corresponding anode terminals being connected together at their ends which project above the tops of the plates. In a similar manner the assembly may be connected in series-parallel, or in a bridge arrangement.

A series connected arrangement is shown in Figure 1, metal sleeves 33 being clamped between appropriate plates and anode terminals, these sleeves being mounted on three of the insulating bushes 8. For clarity, these sleeves are not shown in Figures 2–5.

The diodes may be connected in parallel as already described, or alternatively by means of a busbar passing through holes 26 in the terminals 22 and strapping these terminals together, and by means of a suitable common connection for the anode terminals. In order that a busbar connection for the anode terminals may be used, some of the latter, say two, may be of the form shown in Figure 7 which shows an alternative construction of anode terminal 27, this terminal having a hole 28 for receiving one of the tiebolts 6, a hole 29 for receiving the tiebolt 24, and a further hole 30 for receiving a busbar which also passes through holes 31 in the other anode terminals adapted for receiving this busbar. In order to convert the series arrangement shown in Figure 1 to a parallel arrangement, the metal sleeves 33 would be removed and the anode terminals 9 and 11 would be replaced by terminals of the form shown in Figure 7. Alternate anode terminals would be clamped to the assembly by tiebolts disposed on opposite sides of the assembly to give a triangular construction as before, but the holes 30 and 31 would now all be aligned, and so may be connected by a common busbar. Two further busbars would be secured at one end to the end plate 7, holes 32 being provided for this purpose, and the plates 1–5 would be strapped together by means of these busbars which would pass through the holes 26.

Each plate, for example the plate 1, comprises a square lamina of copper or aluminum with a terminal 22 for an external lead formed integrally therewith. A square mounting hole 20 whereby a diode may be mounted on the plate, a circular opening 21 arranged so that a diode 13 mounted on another plate may protrude therethrough, and holes for tiebolts 6 whereby a plurality of plates may be assembled, are provided on the plate. The mounting hole 20 is positioned on a diagonal at a short distance from the centre of the plate while the circular opening 21 is positioned at substantially the same distance from the centre on the other diagonal. All the plates are of the same construction except for the positions of the circular opening and mounting hole relative to the holes for the tiebolts and to the terminal 22. The circular opening and the mounting hole are so positioned that when the plates are assembled the opening in any one plate between two other plates, is aligned with the mounting hole in one adjacent plate, and the mounting hole is aligned with the circular opening in the other adjacent plate. The terminals 22 formed integrally with the plates are so positioned that the terminals on alternate plates are aligned. It will be seen that every fourth plate in the completed assembly is of identical construction. The holes for the tiebolts are preferably arranged adjacent to the periphery of the plate in order that the diode may be mounted as close to the centre of the plate as possible while allowing it to be suitably spaced from the circular opening. This arrangement provides the most efficient cooling of the diodes by the plates.

A rectifier assembly in accordance with the present invention may be achieved by other means without departing from the scope of the invention. For example, all the plates may be identical, each plate being square and having four symmetrically arranged holes for the tiebolts, and a number of holes whereby a terminal may be bolted to the plate in any desired position. The opening and mounting hole would be positioned, as in the above example, on diagonals of the square plate.

It will be understood that instead of being mounted on an individual fin member as shown in Figure 1, a diode may be mounted upon a fin system comprising a number of fin members fastened together in such a manner as to provide an extended heat-dissipating surface for diode mounted upon the fin system, and that such a system is within the meaning of the term "cooling fin" used in this specification.

I claim:

1. A rectifier assembly of the kind comprising a plurality of rectifier elements and a plurality of spaced cooling fins upon which the rectifier elements are mounted, wherein the cooling fins are so arranged that a rectifier element mounted on one cooling fin protrudes through an opening in an adjacent cooling fin, and wherein electrical connections to the electrodes of the rectifier elements are made via the cooling fins and via terminals mounted on the assembly, these terminals being spaced from the cooling fins.

2. A rectifier assembly as claimed in claim 1, wherein the cooling fins are clamped together by means of a plurality of tiebolts extending through the assembly.

3. A rectifier assembly as claimed in claim 2, wherein the terminals are clamped onto the assembly by at least one of the said tiebolts, means being provided to insulate at least one of the groups selected from the two groups of components, which groups comprise respectively the terminals and the cooling fins, from the tiebolts and to space the terminals from the cooling fins.

4. A rectifier assembly as claimed in claim 3, wherein the terminals are rigidly mounted on the assembly by means of at least two of the said tiebolts and by an additional tiebolt which is spaced from the cooling fins and common to all the terminals.

5. A rectifier assembly as claimed in claim 3 wherein an electrical connection is made between any adjacent pair of said components, by means of a metal sleeve mounted on a tiebolt and insulated therefrom.

6. A cooling fin for a rectifier assembly of the kind comprising a plurality of rectifier elements and a plurality of spaced cooling fins upon which the rectifier elements are mounted, comprising a plate, means whereby a rectifier element may be mounted on the plate, means adjacent to the periphery of the plate whereby the plate may be clamped to a plurality of cooling fins, and an opening so arranged that a rectifier element mounted on an adjacent fin may protrude therethrough.

No references cited.